Dec. 12, 1967   O. LE ROY HOLLIS   3,357,158
PROCESS AND AGENTS FOR MAKING CHROMATOGRAPHIC SEPARATIONS
Filed June 1, 1965   5 Sheets-Sheet 4

Fig. 4

INVENTOR.
Oscar LeRoy Hollis
BY
Jerome Rudy
ATTORNEY

Fig. 5

United States Patent Office 3,357,158
Patented Dec. 12, 1967

3,357,158
PROCESS AND AGENTS FOR MAKING CHROMATOGRAPHIC SEPARATIONS
Oscar Le Roy Hollis, Lake Jackson, Tex., assignor to The Dow Chemical Company, Midland, Mich., a corporation of Delaware
Filed June 1, 1965, Ser. No. 460,331
16 Claims. (Cl. 55—67)

This invention relates to a method and agents for making chromatographic separations. It relates more particularly to a method and agents for the separating of difficultly separable compounds in chromatographic separations and pertains especially to a method and agents for separating water from other compounds in a vapor and/or gas chromatographic procedure.

It is known to make chromatographic separations by contacting a mixture of gases, or vapors of a mixture of substances, alone, or in a carrier gas, with a bed of a solid material which sorbs the materials, or is coated with a substance that sorbs and then releases said materials so that resolution of the mixture into its components, or separation of the substances from one another, occurs. The method is useful for many purposes. For example, U.S. Patents Nos. 3,156,546; 3,159,019; and 3,167,946; describe chromatographic methods, apparatus and analysis.

However, the methods and agents heretofore used for chromatographic separations are not suitable for separating mixtures of substances containing small amounts of water; or mixtures of substances cannot be separated because of the order in which they are sorbed and desorbed; or the separation of the substances is so difficult as to render positive identification or analysis of a mixture unreliable.

Accordingly, it is a primary object of the invention to provide a method and new agents for the carrying out of vapor and/or gas chromatographic separations. Another object is to provide a method and agents for separating difficultly separable compounds from one another and from water or water vapor, in a vapor chromatographic procedure. Other and related objects may appear from the following description of the invention.

According to the invention, vapor chromatographic analyses can readily be carried out and the separating and identifying of heretofore known to be difficultly separable mixtures of compounds, including the separating of water or water vapor in a mixture of compounds, can readily be obtained by contacting vapors of the materials to be separated from one another in a carrier gas with an insoluble, normally solid, finely divided, microporous, organic polymer as hereinafter defined, e.g. a microporous copolymer of a divinyl aromatic hydrocarbon and a monovinyl aromatic hydrocarbon, such as a copolymer of divinylbenzene and ethylvinylbenzene, a copolymer of divinylbenezene and styrene, or a copolymer of divinylbenzene, ethylvinylbenzene and styrene, or a homopolymer of ethylene glycol dimethacrylate.

The invention is especially useful in its general applicability to the analysis of water in a variety of mixtures of compounds, particularly in the analysis of water in hygroscopic materials and in liquids which have boiling points lower than, and up to, that of water. Surprisingly, it has been found that the water is oftentimes eluted prior to most of the more volatile materials. For example, when using vinyl aromatic polymers of the above mentioned type, it is found that only the $C_1$ and $C_2$ hydrocarbons and the components of air are eluted prior to water. Accordingly, small amounts of water can readily be determined in a vapor chromatographic procedure in many organic materials, or products, because the water is eluted prior to eluting the major organic component.

The microporous resinous polymer to be employed can be any rigid, crosslinked, insoluble organic polymer having a plurality of interconnecting pores therein, a surface area of at least 50 square meters per gram, a high porosity and is in the form of particles of sizes between about 5 and 500 microns. Best results are obtained when the polymer is used in the form of particles having a relatively narrow range of sizes, or of substantially the same size, e.g. of sizes from 5–8, from 150–200, or from 400–500 microns. The crosslinking must be sufficient to maintain a rigid structure, and to inhibit or prevent appreciable shrinking upon drying, which decreases the porosity of the polymer. The amount of crosslinking necessary is dependent in part both upon the crosslinking agent and the monomer being polymerized and the manner in which the polymer is made. In the instance where the monomer is difunctional it can act as a crosslinking agent. For example, a polymer made of divinylbenzene alone will be highly crosslinked, as will a polymer prepared exclusively from ethylene glycol dimethacrylate. Either of these polyfunctional monomers can be used to make crosslinked homopolymers or copolymers with one another, or to crosslink polymers made from mixtures of such divinyl monomers and other copolymerizable monoethylenically unsaturated monomers.

Polymers useful in the process of the invention are: the homopolymers of divinylbenzene, divinyltoluene, divinylxylene, or ethylene glycol dimethacrylate; copolymers of any two or more of such divinyl monomers; or copolymers of at least 20 percent by weight of at least one such divinyl monomer and up to 80 percent by weight of a monovinyl aromatic hydrocarbn such as styrene, ethylvinylbenzene, vinyltoluene, vinylxylene, isopropylstyrene, t-butylstyrene, or sec-butylstyrene. Mixtures of two or more polyvinyl monomers such as, for example, divinyl benzene, divinyl toluene, divinylxylene, diallyl, phthalate, diallyl fumarate, or ethylene glycol dimethacrylate, can also be used. These latter difunctional monomers can be used alone, or with the monovinyl aromatic hydrocarbon monomers, to give cross-linked homopolymers and copolymers, respectively. Other non-aromatic monethylenically unsaturated monomers useful in forming copolymers with the aforementioned divinyl monomers are: methyl methacrylate, ethylene glycol monomethacrylate, ethyl acrylate, propyl acrylate, butylacrylate, vinyl acetate, vinyl propionate and the like. Copolymers prepared from monomers such as N-vinyl pyrrolidone, 4-vinyl pyridine, N-vinyl morpholinone and N-vinyl oxazolidinone and the difunctional monomers such as divinyl benzene, or ethylene glycol dimethacrylate, and/or one or more monovinyl aromatic hydrocarbons can also be used in the proportions hereinbefore stated.

The microporous copolymers can be prepared by polymerizing the monomers in admixture with from about 0.5 to 20 times their weight of a solvent that is miscible with the monomers, but exhibits or has limited solubility for the polymer.

The solvent for the monomer or diluent must be non-polymerizable with the monomers, and only swell, but not dissolve the polymer. The size of the pores in the polymer and its density is dependent in part upon the kind of solvent employed, e.g. whether an aromatic hydrocarbon such as toluene or ethylbenzene, or an aliphatic compound such as heptane or an alcohol such as isoamyl alcohol, or a mixture of such compounds is employed. The polymerization can be carried out in mass or in aqueous suspension, at temperatures between 50° and 120° C. and at atmospheric, subatmospheric, or superatmospheric pressure.

In preparing the polymer, a reaction vessel is charged with suitable amounts of styrene, ethylvinylbenzene and divinylbenzene, or a desired amount of other suitable monomers or monomer, and an inert liquid such as diethylbenzene, octane, or isoamyl alcohol, or a mixture of diethyl benzene and isoamyl alcohol. A catalyst, e.g. 0.01 to 1 percent by weight of benzoyl peroxide, based on the total weight of the monomer is added. The vessel is purged with nitrogen to remove air, then sealed. The mixture is heated and stirred at temperatures between 50° and 120° C. until the monomer is polymerized. The vessel is opened and the porous polymer removed.

Other methods for making porous cross-linked styrene polymers are described in British Patent No. 980,229, wherein microporous hydrocarbon polymers are prepared by heating a mixture of a thermoplastic hydrocarbon polymer such as polystyrene and a water-soluble anionic surfactant to a temperature sufficient to render the polymer and surfactant mutually soluble. The resulting homogeneous mixture is cooled, after which the surfactant phase is removed by extraction with water or other liquid in which the surfactant is soluble and the polymer is not. A peroxide cross-linking agent may be included in the mixture to cross-link the polymer before cooling and extraction of the surfactant.

U.S. Patent No. 2,537,951 makes porous cross-linked copolymers of vinyl aromatic compounds, such as a mixture of styrene, ethylvinylbenzene and divinylbenzene.

The various cross-linked insoluble popcorn or proliferous polymers such as are described by Kondakow (J. prakt Chim. [2] 64, p. 109(1961)); Carothers (J.A.C.S. 53, p. 4203 (1931)); Staudinger et al. (Berickte 68, p. 1618 (1935)); Britton (U.S. Pat. No. 2,341,175 of Feb. 8, 1944); Karasch et al. (Ind. Eng. Chem. 39, p. 830 (1947)); and mentioned in U.S. Patents Nos. 2,597,437-8-9 and 2,597,493, can also be used, as well as the microporous polymers used for the preparation of ion exchange resins described in British Patent No. 889,304, with the proviso that said cross-linked insoluble polymers have a surface area of at least 50 square meters per gram, and are in the form of particles of sizes between about 5 and 500 microns.

The following examples illustrate ways in which the principle of the invention has been applied, but are not to be construed as limiting its scope.

EXAMPLE 1

(A) A charge of 900 ml. of a liquid consisting of a mixture of 55 percent by weight of divinylbenzene, 43 percent of ethylvinylbenzene and 2 percent by weight of diethylbenzene, and 600 ml. of diethylbenzene as solvent and reaction medium, together with 5.5 grams of azobisisobutyronitrile as catalyst, was suspended in 1500 ml. of water containing 100 grams of finely divided basic magnesium carbonate $(3MgCO_3 \cdot Mg(OH)_2 \cdot 3H_2O)$, as suspending agent and 0.1 gram of potassium dichromate. The mixture was stirred and heated under time and temperature conditions as follows: 4 hours at 50° C., 4 hours at 55° C.; and 16 hours at 65° C., to polymerize the monomers in the mixture. Thereafter, concentrated hydrochloric acid was added to the mixture in amount sufficient to neutralize the basic magnesium carbonate and bring the aqueous liquid to a pH value between 3 and 4. The polymer was recovered by filtering and was washed with water, then with acetone, and finally with diethylbenzene. The product was in the form of small particles having a large surface area and a high porosity. The product was separated into fractions having particles of sizes between 119–165 microns; 150–196 microns; 173–238 microns and 192–288 microns. The product having particles of sizes between 119 and 165 microns was separated from the main portion of the product and was washed with acetone, after which the washed product was dried by heating it at temperatures between 70° and 80° C. in vacuum oven at an absolute pressure of less than one millimeter, for a period of 16 hours. The surface area of the polymer was 700 square meters per gram.

(B) A portion of the dried polymer of 119–165 micron size particles prepared in part A above, was placed in a ⅛″ I.D. aluminum tube to form a bed of the polymer 90 centimeters deep, and in another similar diameter tube to form a bed of the polymer 180 centimeters deep. The 90 cm. long tube and the 180 cm. long tube were used in separate tests of the polymer. One end of the tube was connected to a Gow-Mac Model 9193, Thermal Conductivity detector. The polymer was conditioned to a state of equilibrium by passing a stream of hydrogen through the 90 cm. bed at a rate of 45 cc./min. and a temperature of 40° C., and through the 180 cm. bed at a rate of 60 cc./min. and a temperature of 75° C. Thereafter, a sample of natural gas consisting principally of methane, was injected into the stream of hydrogen carrier gas flowing at the stated rates of 45 and 75 milliliters per minute respectively, and was passed through the respective bed of the conditioned polymer. The order and the time of elution of the individual ingredients in the effluent gas from the respective beds of the polymer at a temperature of 75° C. and at 40° C., as determined by the thermal conductivity detector were as follows:

| Ingredient | Polymer Bed | |
|---|---|---|
| | 180 cm. | 90 cm. |
| | Temperature | |
| | 75° C. | 40° C. |
| | Elution Time, Min. | |
| Oxygen and Nitrogen | 0.31 | 0.22 |
| Methane | 0.45 | 0.31 |
| Carbon Dioxide | 0.72 | 0.62 |
| Ethylene | 1.21 | 1.17 |
| Ethane | 1.60 | 1.60 |
| Water (vapor) | 1.78 | 2.14 |
| Propane | 5.67 | 7.58 |

Figure 1:
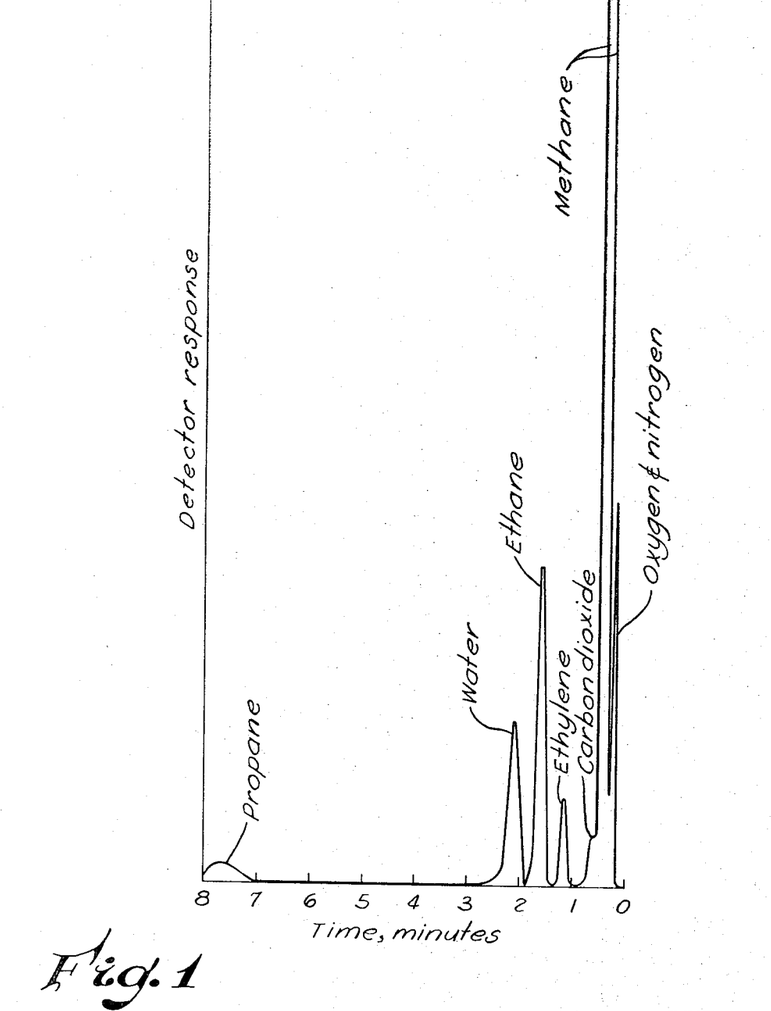

FIG. 1 of the drawing is a graph of the detector response versus the time in minutes for elution of the ingredients in the above tests employing the 90 cm. deep bed of the polymer and a temperature of 40° C.

EXAMPLE 2

A copolymer of 21.8 grams of styrene, 10 grams of divinylbenzene and 7.8 grams of ethylvinylbenzene, was prepared by polymerizing the monomers in an aqueous suspension containing basic magnesium carbonate as suspending agent and a mixture of diethylbenzene and isoamyl alcohol, as diluent employing procedure similar to that employed in part A of Example 1. The product consisting of copolymer particles of sizes between 124 and 206 microns was separated, and was washed and dried. The dried copolymer was placed in a 2-millimeter internal diameter aluminum tube to form a bed of the copolymer 180 centimeters deep. The bed of the copolymer was conditioned by passing helium therethrough at a temperature of 30° C. for a period of 16 hours. Thereafter, a mixture of gases consisting of methane, ethylene, ethane, and acetylene was introduced into the stream of helium carrier gas flowing at a rate of 20 ml./min. The effluent gas flowing from the bed of the copolymer was passed to a Perkin-Elmer Model 800 Gas Chromatograph having a flame ionization detector. The order and the elution time for the individual gases in the mixture were as follows:

| Compound: | Elution time, min. |
|---|---|
| Methane | 0.60 |
| Ethylene | 1.78 |
| Acetylene | 1.90 |
| Ethane | 2.20 |

EXAMPLE 3

A mixture of compounds of different chemical and physical properties was introduced into a thermal conductivity detector gas chromatograph with the 180 cm. bed of the polymer in the column used in Example 1. The carrier gas flow through the column was 60 cc./min. of hydrogen and the temperature of the column was 115° C. The order and elution time for the individual components were as follows:

| Compound: | Elution time (min.) |
|---|---|
| Air | 0.30 |
| Water | 1.00 |
| Methanol | 2.04 |
| Vinyl chloride | 3.60 |
| Ethanol | 5.00 |
| Propylene oxide | 8.40 |
| Acetone | 9.50 |
| Diethyl ether | 15.70 |

Figure 2:
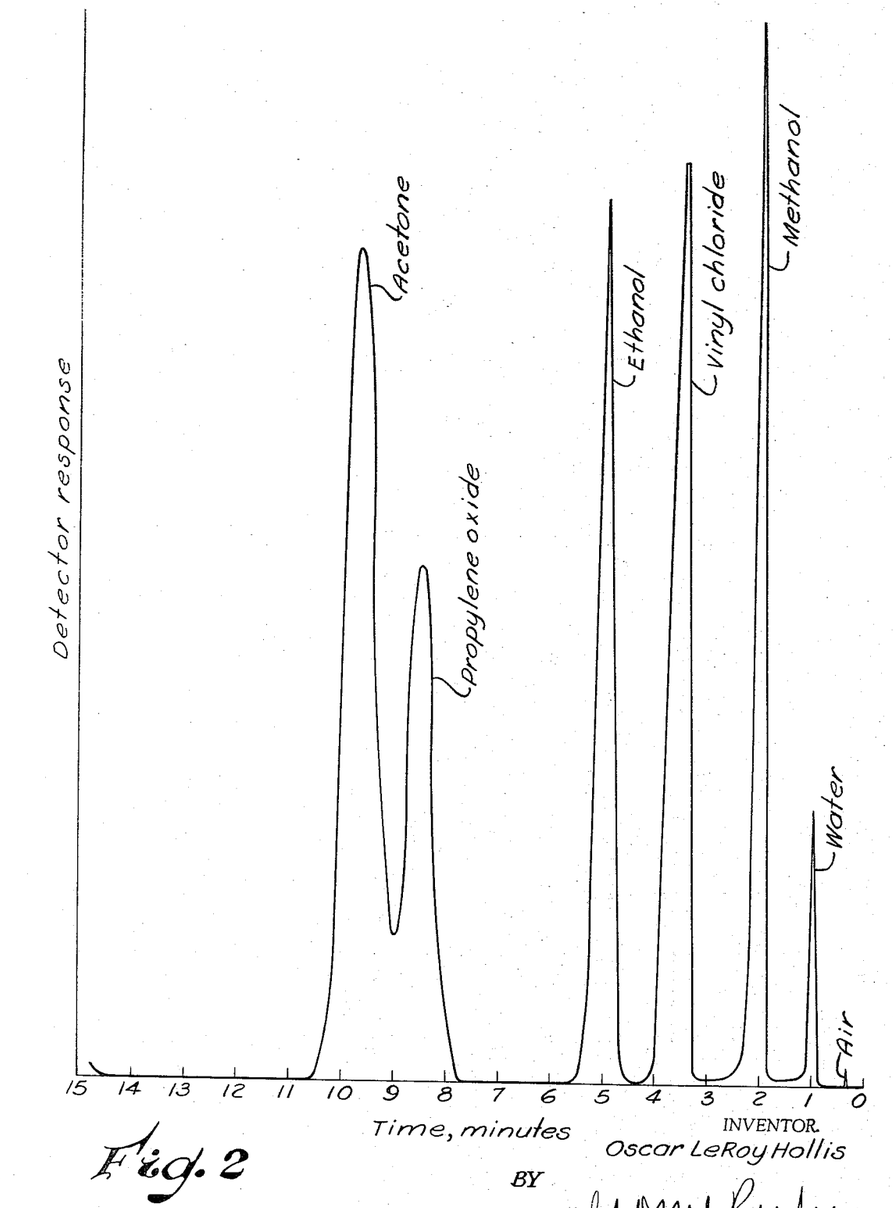

FIG. 2 of the drawing is a graph of the detector response versus elution time as determined for the above compounds, except diethyl ether.

The order of elution illustrates the utility of the microporous copolymer as column packing material in allowing the rapid analysis of water and/or low molecular weight alcohols in admixture with very low boiling organic compounds of different chemical types. The material is useful in the analysis of trace amounts of ethanol and/or methanol in blood or breath samples.

EXAMPLE 4

A polymer similar to that prepared in part A of Example 1 was placed in a 2 mm. internal diameter aluminum tube to form a bed of the polymer 180 cm. deep. The polymer was conditioned by passing helium through the bed at a rate of 20 ml./min. and a temperature of 110° C. for a period of 16 hours. Thereafter, a mixture of water, methyl alcohol, ethyl alcohol, n-propyl alcohol and tert.-butyl alcohol was injected into the stream of the helium carrier gas and the mixture of vapors was passed through the bed of the polymer in the tube. The effluent gas was passed to a Perkin-Elmer Model 820 Gas Chromatograph having a thermal conductivity detector. The order and the time of elution for the individual components in the mixture were as follows:

| Compound: | Elution time (min.) |
|---|---|
| Water | 0.86 |
| Methyl alcohol | 1.32 |
| Ethyl alcohol | 2.80 |
| Propyl alcohol | 8.07 |
| t.-Butyl alcohol | 10.0 |

EXAMPLE 5

On a 180 cm. (6-foot x ⅛ inch I.D. tube) column of the polymer of Example 1, of 173–288 micron particle size, a mixture of low molecular weight alcohols was separated. The separation occurred in the order of the number of carbon atoms contained in the alcohol. The column was maintained at 171° C. Argon gas was used as a carrier and an argon ionization detector was used in a Model #10 Barber-Coleman Gas Chromatograph unit. The order of elution and retention time are given in the following table.

| Alcohol: | Retention time (min.) |
|---|---|
| Methanol | 2.04 |
| Ethanol | 3.35 |
| i-Propyl | 5.25 |
| n-Propyl | 6.90 |
| t-Butyl | 8.05 |
| Sec.-butyl | 11.4 |
| i-Butyl | 12.9 |
| n-Butyl | 15.4 |

EXAMPLE 6

A mixture of alcohols and ethylene glycol and propylene glycol were injected into a stream of helium carrier gas and were passed through a bed 90 cm. deep of polymer of a kind and size similar to that employed in part B of Example 1 and at a temperature of 150° C. The order and the elution time for the individual compounds were as follows:

| Compound: | Elution time (min.) |
|---|---|
| Methyl alcohol | 0.47 |
| Ethyl alcohol | 0.80 |
| Isopropyl alcohol | 1.33 |
| Allyl alcohol | 1.60 |
| Propyl alcohol | 1.80 |
| Ethylene glycol | 3.70 |
| Propylene glycol | 6.38 |

EXAMPLE 7

An industrial grade propylene glycol was analyzed on the 180 cm. column as in Example 1 operating at 200° C. and 47 cc./min. of hydrogen flow rate. The compounds identified and their elution times are shown below:

| Compound: | Elution time (min.) |
|---|---|
| Air | 0.40 |
| Water | 0.70 |
| Ethylene glycol | 4.40 |
| Propylene glycol | 6.00 |

Figure 3:
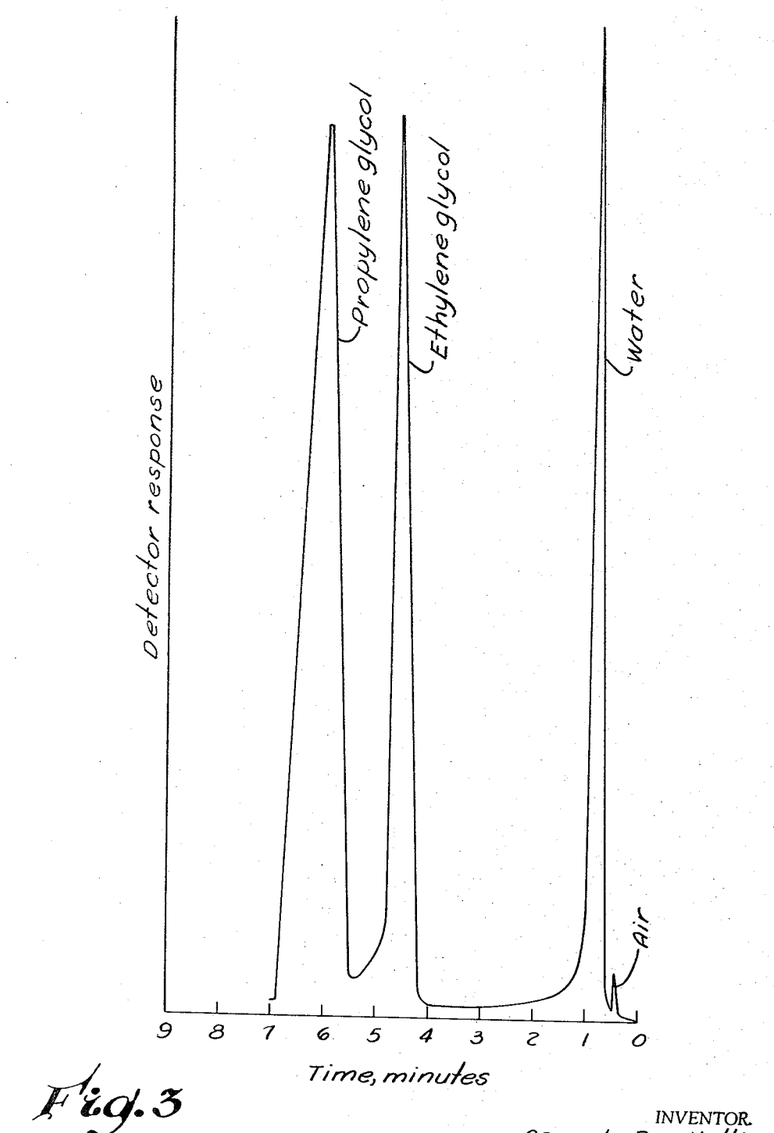

FIG. 3 is a graph of the detector response versus elution time.

EXAMPLE 8

A mixture of ethylene and propylene oxides and ethylene and propylene glycols containing a small amount of water, was passed through the 90 cm. bed of the copolymer of Example 1 at a temperature of 158° C. and a flow rate of 60 cc./min. of hydrogen. The order and time of elution was as follow:

| Compound: | Elution time (min.) |
|---|---|
| Water | 0.22 |
| Ethylene oxide | 0.58 |
| Propylene oxide | 1.07 |
| Ethylene glycol | 3.22 |
| Propylene glycol | 5.43 |

It should be noted that the gas chromatographic separation of ethylene glycol from propylene glycol with the ethylene glycol being eluted first has not heretofore been possible. Having the ethylene glycol eluted first makes possible the analysis of trace quantities of ethylene glycol in propylene glycol. It is pointed out that water is also eluted first from the bed of the copolymer. This fact makes it possible to analyze such materials for water by a gas chromatographic process.

Figure 4:
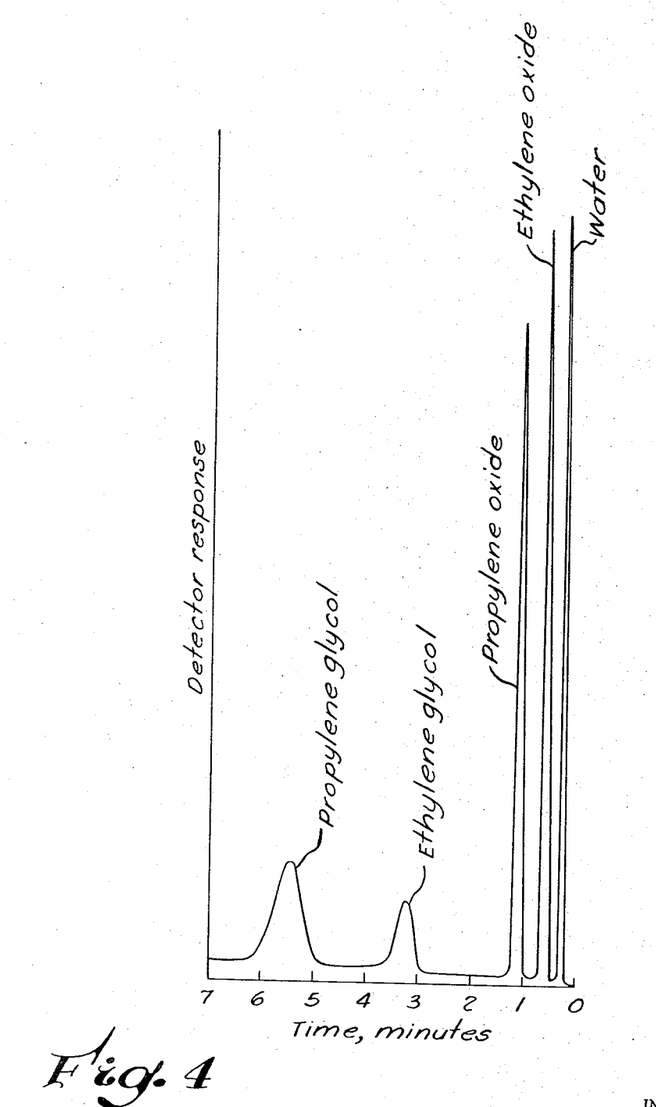

FIG. 4 of the drawing is a graph of the detector response versus elution time for the above test.

EXAMPLE 9

A mixture of lower alkanoic acids containing some water was injected into a stream of hydrogen carrier gas at a temperature of 196° C. and a flow rate of 75 cc./min. and passed through a 180 cm. bed of polymer of a kind and size similar to that employed in Part B of Example 1. The order and elution time for the compounds were as follows:

| Compound: | Elution time (min.) |
|---|---|
| Air | 0.28 |
| Water | 0.38 |
| Formic acid | 0.76 |
| Acetic acid | 1.23 |
| Propionic acid | 2.30 |

EXAMPLE 10

A polymer similar to that prepared in Part A of Example 1 was placed in a 2 mm. internal diameter aluminum tube to form a bed of the polymer 360 centimeters deep. The tube was cooled in a Dry Ice-acetone bath to a temperature of —78° C. Thereafter, the polymer was conditioned by passing a stream of helium therethrough. A charge of air was introduced into the stream of helium carrier gas flowing at a rate of 25 ml./min. and was passed through the bed of the polymer. The effluent gas was analyzed using a thermal conductivity cell. The order and elution time for the individual components were as follows:

| Component: | Elution time at —78° C. (min.) |
|---|---|
| Nitrogen | 3.3 |
| Oxygen | 4.0 |
| Argon | 4.3 |

When using heretofore known materials for the separation of atmospheric gases by chromatography, the elution order is oxygen followed by nitrogen. Only on molecular sieves does argon effectively separate from oxygen and nitrogen. The order of elution is argon, oxygen, then nitrogen, which is the opposite of that found with this porous polymer. This fact is of particular advantage in the detection of trace quantities of nitrogen in oxygen or argon, or of nitrogen and oxygen in argon, since, ideally in the determination of trace components by gas chromatography, the trace component must be eluted before the major constituent, because the peak shape will be better for quantitative determination, and there will be less interference from contamination by the major component such as is experienced when the the trace is eluted after, and on the trailing edge of, the major constituent.

EXAMPLE 11

(A) In another experiment a second mixture of gases was passed through the same column and under the same conditions as that of Example 10. The following order and elution time of components was observed.

| Component: | Elution time at —78° C. (min.) |
|---|---|
| Hydrogen | 0.80 |
| Nitrogen | 1.90 |
| Argon | 2.50 |
| Nitric oxide | 3.85 |

The temperature was then raised to 40° C. by placing the column in a water bath. Two more components were eluted:

| Component: | Elution time at 40° C. (min.) |
|---|---|
| Carbon dioxide | 6.60 |
| Nitrous oxide | 7.00 |

EXAMPLE 12

The column used in Example 10 was used to separate $CO_2$ from $N_2O$ at 30° C., using 20 cc./min. of helium as carrier gas. This has heretofore been a difficult separation by gas chromatography with most gas-solid systems, and usually requires multiple columns of materials and results in distorted peak shapes.

The order and elution time were as follows:

| Component: | Elution time (min.) |
|---|---|
| Air | 1.00 |
| Carbon dioxide | 2.22 |
| Nitrous oxide | 2.78 |

EXAMPLE 13

A charge of 750 ml. of ethylene glycol dimethacrylate together with 750 ml. of methyl isobutyl ketone and 5.5 grams of azobisisobutyronitrile as catalyst, were added to a 5 liter three-neck glass reaction vessel equipped with a reflux condenser and stirrer and containing 1500 ml. of water having dispersed therein 50 grams of basic magnesium carbonate, 0.1 gram of $K_2Cr_2O_7$ and 12 grams of methyl cellulose. The mixture was stirred and was heated at a temperature of 55° C. for a period of 5 hours, then was stirred and maintained at 65° C. for 20 hours longer. The polymer was recovered employing procedure similar to that employed in Example 1 and was washed with water and dried. The dried polymer was screened. A portion of the polymer of particles of sizes from 100 to 140 mesh per inch as determined by U.S. Standard screens was placed in a ⅛ inch internal diameter aluminum tube 3 feet long. The column was connected to a gas chromatographic apparatus having a Gow-Mac thermal conductivity detector. The polymer was conditioned by passing a stream of hydrogen through the bed at a rate of 55 cc. per minute at a temperature of 115° C. Thereafter a mixture of gases was injected into the stream of hydrogen carrier gas and was passed through the bed of the polymer. The order and the time of elution of the individual gases from the bed were as follows:

| Component: | Elution time (min.) |
|---|---|
| Air | 0.17 |
| Methane | 0.20 |
| Ethylene | 0.31 |
| Ethane | 0.38 |
| Propane | 1.00 |
| Water | 2.28 |
| Isobutane | 2.50 |

EXAMPLE 14

A mixture of organic acids was injected into a stream of hydrogen carrier gas and was passed through the bed of the copolymer as described in Example 13 at a temperature of 169° C. The order and elution time for the components was as follows:

| Component: | Elution time (min.) |
|---|---|
| Water | 0.70 |
| Formic acid | 4.6 |
| Acetic acid | 7.2 |
| Propionic acid | 15.0 |

EXAMPLE 15

A polymer of about 46.75 percent by weight of divinylbenzene, 38.25 percent ethylvinylbenzene and 15 percent N-vinylpyrrolidone was prepared employing procedure similar to that used in Example 1 from a mixture of 75 parts by volume of commercial divinylbenzene consisting of about 55 percent divinylbenzene and about 45 percent ethylvinylbenzene and 25 parts by colume of N-vinylpyrrolidone and with diethylbenzene as the diluent. The product was an insoluble microporous polymer. It was screened to particles of sizes 70–100 mesh and packed in an aluminum tube of ⅛" I.D. to form a bed 6 feet deep. The polymer was conditioned by passing helium gas through the bed. A sample of gas containing a mixture of HCl, chlorine and water was passed therethrough using helium as the carrier gas. Column conditions were 60 cc./min. flow rate at 78° C. Elution times were water, 6.3 min.; hydrogen chloride, 36.0 min.; and chlorine, 39.3 min. A thermal conductivity detector system was used.

EXAMPLE 16

A copolymer of about 51.15 percent by weight divinylbenzene; 41.85 percent diethylbenzene and 7 percent N-vinyl pyrrolidone was made by procedure similar to that used in Example 15. The polymer particles were packed into a 6' x ⅛" I.D. aluminum tube and a thermal conductivity cell used to detect the composition of the effluent. After conditioning in the usual manned with helium, a sample of gas containing chlorinated hydrocarbons and other constituents was injected into the helium stream used as a carrier gas. The following elution times for the components were observed. Column conditions were 116° C. and a flow rate of 50 cc./min. of He gas.

| Component: | Elution time (min.) |
|---|---|
| Water | 1.00 |
| Methyl chloride | 1.45 |
| Hydrogen chloride | 1.90 |
| Methylene chloride | 6.6 |
| Chloroform | 8.2 |

EXAMPLE 17

A copolymer of divinylbenzene and ethylvinylbenzene was prepared as in Example 1. Particles of this copolymer were sized to 117–180 micron range and packed into a 6′ x 1/8″ I.D. aluminum tube. A thermal conductivity cell was used to detect the composition of the effluent. The column was conditioned by passing helium gas therethrough. A sample of a liquid containing ethylene oxide was introduced into the helium carrier gas. The following elution times of the components were observed when the column was run at a flow rate of 47 cc./min. at 133° C.

| Component: | Elution time (min.) |
|---|---|
| Air | 0.42 |
| Carbon dioxide | 0.65 |
| Water | 1.10 |
| Ethylene oxide | 2.8 |

EXAMPLE 18

A copolymer, made as in Example 15, was used in an aluminum column (6′ x 3/32″ I.D.) to analyze a gas mixture at a temperature of 98° C., and a flow rate of 23 cc./min. of helium as carrier gas. The results were as follows:

| Component: | Elution time (min.) |
|---|---|
| Air | 0.35 |
| Methane | 0.53 |
| Ethylene | 0.86 |
| Ethane | 1.03 |
| Propane | 2.94 |
| Water | 4.40 |

EXAMPLE 19

A copolymer was prepared in the manner of Example 15, except that a mixture of 10 vol.-percent of 4-vinyl pyridine was used, together with 90 vol.-percent of the commercial divinyl benzene, and using a ratio of 60 parts of monomer to 40 parts of diethylbenzene as diluent.

The polymer beads were of sizes of about 50–100 mesh per inch as determined by U.S. Standard screens. They were packed in an aluminum tube 6′ x 1/8″ I.D. A sample of natural gas was injected into the column at a temperature of 105° C., using a flow rate of 50 cc./min. of He gas. The following table shows the components and their elution times:

| Component: | Elution time (min.) |
|---|---|
| Air | 0.65 |
| Methane | 0.85 |
| Carbon dioxide | 1.2 |
| Ethylene | 1.65 |
| Ethane | 1.95 |
| Propane | 4.95 |
| Water | 12.4 |

EXAMPLE 20

A copolymer was prepared from a mixture of 109 grams of t-butyl styrene, and 91 grams of commercial divinylbenzene using a mixture of 120 g. diethylbenzene and 180 g. of iso-amyl alcohol as diluent and procedure as in Example 1. The resulting polymer beads were packed into an aluminum tube 3′ x 3/32″ I.D. A mixture of alcohols and acetone was passed through the bed of the copolymer at 100° C. and a flow rate of 20 cc./min. of He as carrier gas. The following table shows components and elution times:

| Component: | Elution time (min.) |
|---|---|
| Methanol | 0.64 |
| Ethanol | 1.50 |
| Acetone | 2.7 |
| n-Propyl alcohol | [1] 4.2 |
| t-Butyl alcohol | [1] 4.2 |

[1] These two alcohols were not separated on this column under these conditions.

The polymer beads used in the preceding examples can also be used as a support for liquids ordinarily used as partitioning agents in gas-liquid chromatographic analysis. These liquids are ordinarily used on relatively inert support media, but most any support will exhibit some adsorptive properties which may adversely affect the analytical result. The polymer exhibits little or no adsorption, but co-acts with the liquid phase to give the partitioning effect. The following examples will serve to illustrate the use of the coated polymer beads.

EXAMPLE 21

The copolymer of Example 1 was treated with a solution of tetraethylenepentamine in diethyl ether and the ether evaporated. The polymer contained 10 percent by weight of TEPA (tetraethylene pentamine). The treated polymer was packed into an aluminum column 6′ x 1/8″ I.D. A gas stream consisting of water, ammonia and a mixture of amines was passed through the treated copolymer at a temperature of 93° C. and a flow rate of 60 cc./min. of $H_2$. The following components were eluted at the times given.

| Component: | Elution time (min.) |
|---|---|
| Air | 0.28 |
| Ammonia | 0.51 |
| Water | 2.5 |
| Ethyleneimine | 4.0 |
| Diethylamine | 6.9 |
| Ethylenediamine | 14.5 |

EXAMPLE 22

The polymer beads of Example 1 were treated with 5 percent by weight solution of diphenylamine in diethyl ether and the solvent evaporated. The treated copolymer was placed in a 6′ x 1/8″ I.D. aluminum tube. A mixture of chlorinated hydrocarbons, water, and air was passed through the column using 100 cc./min. flow of helium at a temperature of 61° C.

The following table shows the components and retention times:

| Component: | Elution time (min.) |
|---|---|
| Air | 0.25 |
| Methane | 0.28 |
| Carbon dioxide | 0.36 |
| Water | 1.05 |
| Methyl chloride | 2.02 |
| Hydrogen chloride | 6.11 |

EXAMPLE 23

The copolymer of Example 1 was coated with 5 percent by weight solution of polypropylene glycol having an average mol. wt. of 2000. The copolymer was placed in a column as in the preceding Example 22. At a temperature of 132° C. and a flow rate of 37.5 cc./min. of hydrogen, water and a mixture of lower alkanols was injected into the carrier gas and passed through the column. The following table shows the components and their elution times.

| Component: | Elution time (min.) |
|---|---|
| H₂O | 1.4 |
| Methanol | 1.85 |
| Ethanol | 3.25 |
| i-Propyl alcohol | 4.9 |
| t-Butyl alcohol | 6.1 |
| 1-propanol | 7.4 |
| 2-butanol | 10.7 |
| 1-butyl alcohol | 12.2 |
| t-Amyl alcohol | 15.5 |

EXAMPLE 24

The polymer beads of Example 1 were treated with 2 percent by weight of Emery 316D (a trimer acid of low volatility). A mixture of acids was separated on a column of the treated copolymer (in an aluminum tube 6′ x ⅛″ I.D.), at a temperature of 187° C. and a flow rate of >50 cc./min. of argon. The following table shows the components and retention times.

| Component: | Elution time (min.) |
|---|---|
| Formic | 0.1 |
| Acetic | 0.15 |
| Propionic | 0.25 |
| Oxalic | 0.5 |
| Malonic | 2.7 |
| n-Hexanoic | 4.2 |
| Succinic | 5.5 |
| n-Heptanoic | 8.5 |
| Glutaric | 10.0 |
| n-Octanoic | 15.0 |
| Adipic | 23.0 |
| n-Nonanoic | 40.0 |
| n-Decanoic | 58.0 |

EXAMPLE 25

The copolymer of Example 1, coated or treated with 10 percent by weight of tetraethylenepentamine and packed in a 6′ x ⅛″ I.D. aluminum tube as described in Example 21. The column was used to determine the amount of water in ethyleneimine by a chromatographic analysis. The test was run at a temperature of 80° C. using a stream of helium as carrier gas. The results were as follows:

| Component | Percent | Elution Time, min. |
|---|---|---|
| Water | 10.72 | 0.75 |
| Ethyleneimine | 89.28 | 3.2 |

Figure 5:
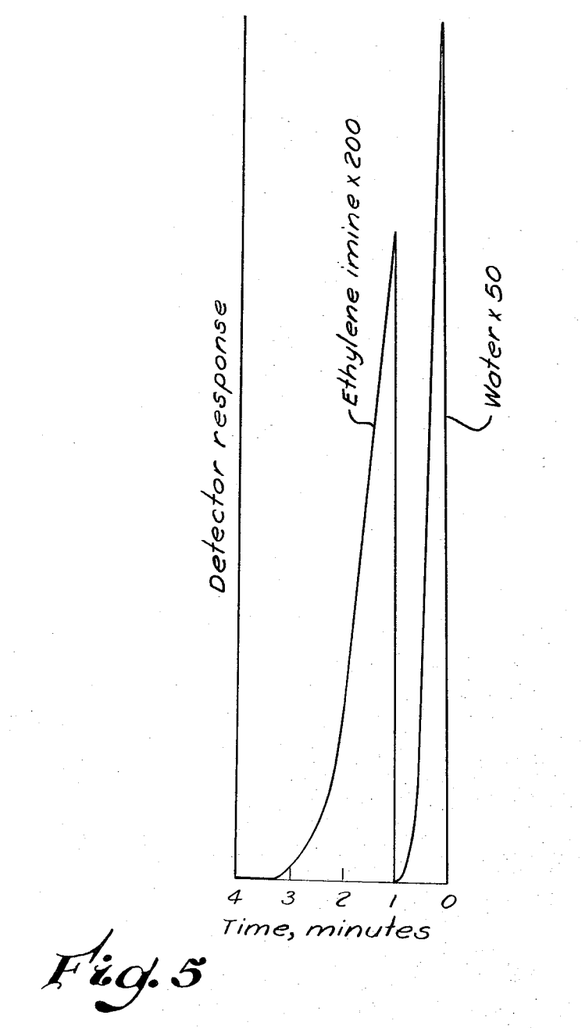

FIG. 5 of the drawing is a graph of the chromatographic curve determined for the mixture. The peaks indicate the thermal conductivity of the constituents. The height and width, or in other words the area under the curve, is a measure of the amount of the constituent.

I claim:

1. In a process of chromatographically separating substances which process comprises passing vapors of said substances in admixture with a carrier gas through an elongated chromatographic column having a stationary sorbent phase, the improvement which consists in using as the stationary phase an insoluble, cross-linked, finely divided, microporous organic polymer consisting essentially of polymerized moieties of a divinyl monomer selected from the group consisting of monocyclic divinyl aromatic hydrocarbons and ethylene glycol dimethacrylate and copolymers thereof and containing at least 20 percent by weight of at least one of said divinyl monomers, and not more than 80 percent by weight of at least one monoethylenically unsaturated monomer copolymerizable therewith selected from the group consisting of monocyclic monovinyl aromatic hydrocarbons, N-vinyl pyridine and N-vinyl pyrrolidone, said microporous polymer having a surface area of at least 50 square meters per gram and being in the form of particles of sizes between 5 and 500 microns.

2. A process as claimed in claim 1, for determining water in a mixture of substances.

3. A process as claimed in claim 1, wherein the microporous polymer is a copolymer of a monocyclic divinyl aromatic hydrocarbon and a monocyclic monovinyl aromatic hydrocarbon.

4. A process as claimed in claim 3, wherein the microporous polymer is a copolymer of divinylbenzene and ethylvinylbenzene.

5. A process as claimed in claim 1, wherein the microporous polymer is a copolymer of divinylbenzene, ethylvinylbenzene and styrene.

6. A process as claimed in claim 1, wherein the microporous polymer is a copolymer of divinylbenzene, ethylvinylbenzene, and N-vinylpyrrolidone.

7. A process as claimed in claim 1, wherein the mixture of gases to be separated contains water, hydrogen chloride and chlorine.

8. A process as claimed in claim 1, wherein the microporous polymer is a copolymer of divinylbenzene, ethylvinylbenzene, and 4-vinyl pyridine.

9. A process as claimed in claim 1, wherein the microporous polymer is contained in a tube as a bed having a ratio of length in millimeters to cross section in square millimeters of from about 300 to 1 to about 1800 to 1.

10. A process of chromatographically separating a mixture of substances from one another, which comprises contacting vapors of said substances in a stream of a carrier gas with a bed of an insoluble, cross-linked, finely divided, microporous copolymer of at least 20 percent by weight of a monocyclic divinyl aromatic hydrocarbon and not more than 80 percent by weight of at least one monocyclic monovinyl aromatic hydrocarbon, said microporous copolymer having a surface area of at least 50 square meters per gram and being in the form of particles of sizes between 5 and 500 microns, whereby said substances are selectively sorbed on said microporous copolymer, continuing flow of said carrier gas through said bed of microporous copolymer, and collecting and analyzing successive fractions of the effluent gases and vapors from said bed of said microporous copolymer.

11. A process as claimed in claim 10, for determining water in a mixture of substances.

12. A process as claimed in claim 10, wherein the polymer is a copolymer of divinylbenzene, styrene and ethylvinylbenzene.

13. A process as claimed in claim 10, wherein the mixture of substances to be separated contains ethylene glycol and propylene glycol.

14. A process as claimed in claim 10, wherein the mixtures of substances to be separated contains ethyleneimine and water.

15. In an apparatus for chromatographically separating a mixture of substances from one another in a gas chromatographic column, the improvement which comprises a stationary sorbent phase within said column comprising a bed of an insoluble cross-linked, finely-divided microporous organic polymer having a surface area of at least 50 square meters per gram, said microporous polymer consisting essentially of polymerized moieties of a divinyl monomer selected from the group consisting of monocyclic divinyl aromatic hydrocarbons and ethylene glycol dimethacrylate and copolymers thereof and containing at least 20 percent by weight of said divinyl monomer, and not more than 80 percent by weight of at least one monoethylenically unsaturated monomer copolymerizable therewith and selected from the group consisting of monocyclic monovinyl aromatic hydrocarbons, N-vinyl pyridine and N-vinylpyrrolidone, and being in the form of particles of sizes between 5 and 500 microns.

16. A process of chromatographically separating substances which process comprises passing vapors of said substances in admixture with a carrier gas through an elongated chromatographic column having a stationary sorbent phase consisting essentially of a microporous homopolymer of ethylene glycol dimethacrylate having a surface area of at least 50 square meters per gram and being in the form of particles of sizes between 5 and 500 microns.

References Cited

Baum, E. H.: Evaluation of Microporous Polyethylene as a Low Temperature Gas Chormatographic Support, Journal of Gas Chromatography, Apr. 13–15, November 1963.

REUBEN FRIEDMAN, *Primary Examiner.*

J. L. DE CESARE, *Assistant Examiner.*